A. WEINFELD.
RAILROAD TICKET.
APPLICATION FILED OCT. 5, 1914.

1,269,026.

Patented June 11, 1918.

UNITED STATES PATENT OFFICE.

ALEXANDER WEINFELD, OF NEW ORLEANS, LOUISIANA.

RAILROAD-TICKET.

1,269,026.     Specification of Letters Patent.     Patented June 11, 1918.

Application filed October 5, 1914.   Serial No. 865,209.

*To all whom it may concern:*

Be it known that I, ALEXANDER WEINFELD, a citizen of the United States, residing at New Orleans, in the county of Orleans and State of Louisiana, have invented certain new and useful Improvements in Railroad-Tickets; and I do hereby declare the following to be a full, clear, and exact description of the invention, such as will enable others skilled in the art to which it appertains to make and use the same.

The invention relates to improvements in railroad tickets.

The object of the present invention is to improve the construction of railroad tickets and to effect a saving of the time of the conductor and at the same time insure the collection of every ticket.

A further object of the invention is to provide a railroad ticket designed for use in connection with a conductor and auditor adapted to account for every cash fare and give both the conductor and auditor a receipt for the same.

Another object of the invention is to do away with conductors' checks which are at the present time placed in a passenger's hat and result in mistakes and loss of fares to railroad companies and to enable the auditor's check for both tickets and fares to operate as a traveler's check without permitting the latter to obtain possession of the same.

With these and other objects in view the invention consists in the construction and arrangement hereinafter fully described illustrated in the accompanying drawings and pointed out in the claims hereto appended it being understood that various changes in the form, size and arrangement within the scope of the claims may be resorted to without departing from the spirit or sacrificing any of the advantages of the invention.

In the drawings,

Figure 1 is a plan view of a mileage exchange ticket constituting an element of the invention, Fig. 2 is a plan view of a railroad ticket given in exchange for cash, Fig. 3 is a similar view showing a ticket having an additional check or coupon for use when the point of destination is beyond the first conductor's run.

Like characters of reference designate corresponding parts in all the figures of the drawings.

In the accompanying drawings in which is illustrated the preferred embodiment of the invention which designates a mileage exchange ticket 1 provided at one end with an auditor's check or coupon L and designed to bear the name of the railroad issuing the ticket, the signature of the agent and the ticket number and similar data. The ticket also bears the name of the place of purchase A and the name of the point of destination C. The mileage exchange ticket shown in Fig. 1 reading "Chicago to New Orleans" and the names occupying the central portion of the ticket.

To the right of the names A and C the ticket has a rectangular space E designed to contain the date of the issue of the ticket and at the lower left hand corner of the said ticket at the point F are placed the letters "B—C" designating baggage check and designed to receive a baggage check punch.

The auditor's check L which is separated from the body portion of the mileage exchange ticket by a transverse row of indentations or perforations to enable the check to be readily detached bears the designation "Auditor's check mileage exchange ticket." This matter is located at the top of the check and below and in spaced relation with the said matter at B is the name of the point of destination; the word "To" being preferably arranged centrally over the name of the point of destination and the word "From" centrally beneath the same with the number "D" indicating the number of miles for which the mileage exchange ticket was issued. The auditor's check also contains a rectangular space E for the date and below the said space are preferably spaced the ticket number and the words "Void if detached" and such other data as may be desired.

In Fig. 2 of the drawing is illustrated a card or railroad ticket 2 and designed to be sold by ticket agents for cash and containing the main features of the mileage exchange ticket, namely the name of the railroad, the name A of the point where the ticket is purchased, the name C of the place of destination, the date space E, the baggage check letters F, the ticket number and other data desired by a railroad. The ticket 2 is also provided with an auditor's coupon L' which bears the words "Auditor's check," name B of the point of destination, the date space E, the number of miles D, the ticket number, and the words "Void if detached" together with any other data desired by the railroad company.

A line of indentations or perforations separates the body of the ticket from the auditor's check and in the body of the tickets 1 and 2, the word "To" is arranged between the name of the place of purchase of the ticket and the name of the point of destination. The name A of the place of purchase of the body of each of said tickets and the name B of the point of destination of the auditor's check and the mileage number D are designed to be printed in red from heavy type so that the conductor may tell at a glance when the holder of the ticket enters a train and the conductor may instantly see where the passenger is to leave the train. There has been a tendency among some of the traveling public to buy a short trip ticket and use it in any direction sometimes traveling as far as two hundred miles on a ten mile ticket.

The auditors' checks are designed to be placed in clamping frames or holders, not shown, secured to the side of the car adjacent to the window and the seat occupied by the passenger, the clamping frames being designed to accommodate two auditors' checks which will account for two persons in each car seat. The passenger does not obtain possession of the auditor's check which is placed in the holder or clamping frame by a conductor and is the property of the railroad company and must be collected just like the tickets. The checks are collected by the conductor and in this way travelers are checked twice. It will also serve as a means for checking every lady and child who are hardly ever checked in the present system leaving the conductor to guess at their points of destination. There has also been a tendency of some of the traveling public to keep conductors' hat checks and even take them from other person's hats and put them in their own hats in order to induce the conductor to believe that he has collected their fare. By using these auditors' checks and placing them in the clamps or holders at the windows access of passengers to the same is prevented and the checks collected by the auditor must correspond with the tickets collected by the conductor.

The auditor's check on the ticket will effect a great saving of fares as it has frequently happened a conductor will request a railroad ticket from a passenger who will put his hand to his hat and make believe he is looking for the hat check, the conductor is supposed to have given him. If the passenger states that he has given his ticket to the conductor and that the hat check has blown off the conductor is liable to pass the passenger, thus losing a fare.

Also tickets reading in the opposite direction have frequently been taken without the conductor detecting such misuse. For instance, a ticket reading from Mobile to Biloxi, can be used from New Orleans to Biloxi, the conductor failing to notice the difference in the names owing to both names being printed in black. Tickets reading in opposite directions have passed through three hands unnoticed namely, the man at the gate, the brakeman of the train who sorts the tickets for the conductor, and the latter. By having the name of the station in large red type where the parties get on the train the said error would rarely occur. The prominent position of the date on the face of the ticket will enable the conductor to see at a glance if the ticket is old and out of date as tickets are generally good only on the date of sale. As a rule the great majority of tickets are stamped on the back and conductors frequently fail to notice the date. The auditor's check enables the conductor to check every passenger and is a great time saver.

When a ticket is to be used on a trip extending beyond the first conductor's run it is provided with a first auditor's check M and the first conductor's check O shown in Fig. 3 of the drawings. These additional checks are designed to be applied to both the mileage exchange ticket and the ticket issued for cash. The first auditor's check is designed to have printed on it such destination and the words "Mileage exchange ticket to the point of destination from" and the number indicating the distance in miles together with a date space and a ticket number and any other data desired. The first conductor's check O contains such destination with the word "From" and the number indicating the destination in miles together with a ticket number and any other data desired by the railroad. When a ticket of this character is presented, the conductor will take up the first conductor's check and the first auditor will take up the first auditor's check, the ticket and the remaining coupons being returned to the passenger. The first auditor's check is placed in the frame adjacent to the seat of the passenger and is removed at the end of the first conductor's run. The new conductor and new auditor will take up the second auditor's check and the ticket, the second auditor's check being left in the frame until the end of the second run.

In practice the conductor collects the tickets and places the auditor's checks in the clamps or holders. The auditor, knowing the number of passengers, collects for the first stop. A new passenger entering the train at any point and not having a check in the clamp or holder corresponding with his seat cannot possibly escape the notice of the conductor, who is thereby enabled to collect all the tickets and avoid the loss of the railroad from redeemed tickets of passengers who have actually traveled over a road without giving up their tickets to the conductor.

After the train leaves the first stop the auditor goes through the train again before the conductor and counts the number of new passengers, which can be told readily by there being no checks in the clamps or holders and this operation continues until the end of the trip.

The improved railroad ticket and system of collecting the same will prevent a station agent from unlawfully assisting a person to travel for less than the regular fare by issuing a ticket for a less distance than the trip and requesting the conductor to accept the same.

What is claimed is:—

1. A railroad ticket comprising a body portion having suitable indicia thereon, and a detachable auditor's check identifying the body portion and bearing the name of the destination and the number of the station of the beginning of the trip.

2. A railroad ticket including a body portion having suitable indicia thereon, a detachable auditor's check at one end of and identifying the body portion, and a terminal coupon detachably connected with the auditor's check and comprising a detachable auditor's check and a detachable conductor's check both identifying the body portion, said auditor's check and the conductor's check bearing the name of the destination and identifying the station at the beginning of the trip by secret indicia.

ALEXANDER WEINFELD.

Witnesses:
D. M. FERTH,
E. J. FUNCK.

Copies of this patent may be obtained for five cents each, by addressing the "Commissioner of Patents, Washington, D. C."